(12) United States Patent
Gu

(10) Patent No.: US 6,431,566 B1
(45) Date of Patent: Aug. 13, 2002

(54) SAFETY DRIVING EQUIPMENT FOR TODDLER'S SCOOTER

(76) Inventor: Hong-Jiun Gu, P.O. Box No. 6-57, Chung-Ho City, Taipei Hsien, 235 (TW)

( * ) Notice: Subject to any disclaimer, the term of this patent is extended or adjusted under 35 U.S.C. 154(b) by 0 days.

(21) Appl. No.: 09/755,159

(22) Filed: Jan. 8, 2001

(51) Int. Cl.$^7$ ................................................ B62M 1/00
(52) U.S. Cl. ............................. 280/87.021; 280/87.051; 16/48
(58) Field of Search ....................... 280/87.021, 87.051, 280/87.01; 16/18 R, 47, 48, 29

(56) References Cited

U.S. PATENT DOCUMENTS 1,666,139 A * 4/1928 Johnson ........................ 16/48
2,007,447 A * 7/1935 Johnson ........................ 16/48
3,433,500 A * 3/1969 Christensen .................... 16/47

* cited by examiner

Primary Examiner—Robert P. Olszewski
Assistant Examiner—James S. McClellan
(74) Attorney, Agent, or Firm—Troxell Law Office PLLC

(57) ABSTRACT

The invention herein relating to a safety driving equipment for a toddler's scooter is mainly comprised of a driving triangular base with a long extended wheel arm at the end opposite to the driving wheels. A universal auxiliary wheel is mounted at the end of the wheel arm and a shaft level disposed between the auxiliary wheel and the middle of the driving wheels forms a center point. The auxiliary wheel can efficiently provide the increased safety area while the scooter in wobbling mainly to maintain the force center shifting within the safety area.

1 Claim, 3 Drawing Sheets

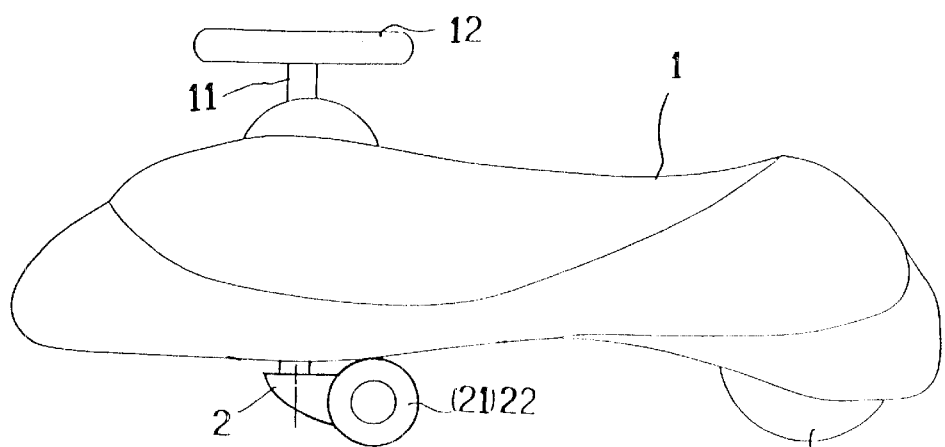
FIG.1
Prior Art
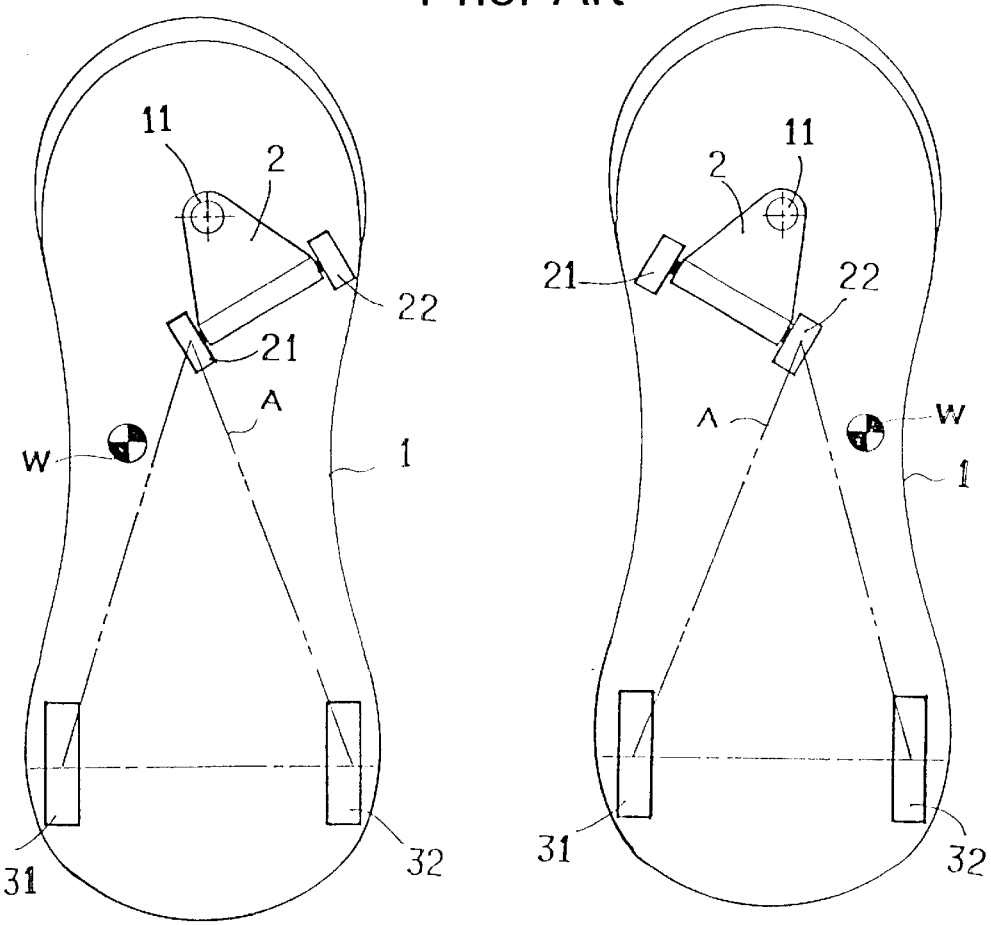
FIG.2
Prior Art
FIG.3
Prior Art

SAFETY DRIVING EQUIPMENT FOR TODDLER'S SCOOTER

BACKGROUND OF THE INVENTION

1) Field of the Invention

The invention herein relates to a safety driving equipment for a toddler's scooter, mainly to provide an auxiliary wheel, relative to the rear wheels of the scooter body, to the driving structure of a toy scooter to increase the safety area and regulating the location of the force center.

2) Description of the Prior Art

As shown in FIGS. 1, the side elevation isometric drawing of a conventional scooter structure comprises of a scooter body (1), mounted with live left and right rear wheels (31, 32) at the rear; in the front, one vertically disposed shaft level (11) with handlebars (12) connected on the top and a driving triangular base (2) fastened at the bottom mounted with left and right rear driving wheels (21, 22); the rider straddled on the scooter body (1) turns the handlebars (12) by hands to drive the triangular base (2) connected through the shaft level (11), thereby to move the left and the right driving wheels (21, 22) alternatively to achieve the function of wobbling movement in arcuation.

Referring to FIGS. 2 and 3, as shown in the bird's-eye view, the driving triangular base (2) centered by the shaft level (11) moves to the left or the right sides to enable the left and the right driving wheels (21, 22) to achieve the purpose of arcuate approach alternatively; furthermore, as the force center (W) on the triangular base swings in a great arc, the force center (W) will define a safety area (A), usually at one of the auxiliary wheel on the driving triangular base and relative to the left rear wheel (31) or the right rear wheel (32); if the force center (W) locates within the safety area (A), the scooter body will not flip over; while moving in a fast speed, the handlebars (12) operated by hands will generate a reaction force which will make the force center (W) to receive a pulling force and shift its position; if the reaction force exceeds a certain degree (while the handlebars are forcefully operated) and accelerates by the inertia force generated from the mass of the human body in a fast proceeding speed, the force center (W) will easily move beyond the safety area (A) and causes the danger of having the scooter body tumble forward and oblique; just as shown in the said Figures, while moving the scooter by operating the shaft level (11) through the handlebars, the triangular base (2) will deviate to right or left due to the generated reaction force and adding in the proceeding inertia of driving, the force center (W) will usually exceed the congruent sides of the triangular safety base; therefore, scooters similar to this kind tend to flip over.

SUMMARY OF THE INVENTION

Specifically, the invention herein is consisted of an extended wheel arm at the end relative to the driving wheels of the driving triangular base; an auxiliary wheel capable of making universal rolling is mounted lively at the end of the wheel arm; the driving triangular base is driven by the handlebars of the scooter body through the shaft level; therefore, by moving around based on the shaft level as the center and utilizing the relationship of the auxiliary wheel relative to the rear wheels of the scooter body to increase the possibility of locating the force center in the regulated safety area.

To enable a further understanding of the said objectives, the technological methods and the efficiency of the invention herein, the brief description of the drawings below is followed by detail description of the preferred embodiment.

BRIEF DESCRIPTION OF THE DRAWINGS

FIG. 1 is a side elevation drawing of a conventional scooter.

FIG. 2 is an isometric drawing of the deviated force center on a conventional scooter in wobbling.

FIG. 3 is a second isometric drawing of the deviated force center on a conventional scooter in wobbling.

DETAILED DESCRIPTION OF THE PREFERRED EMBODIMENT

Figure 4:
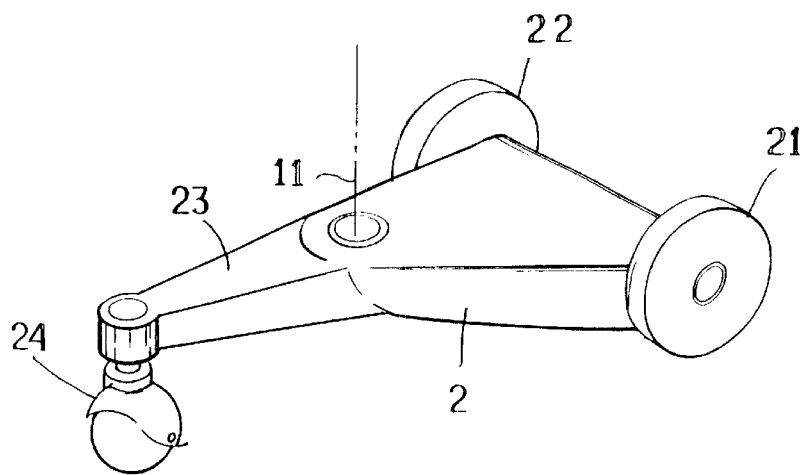
FIG. 4 is a pictorial drawing of the invention herein.
Figure 5:
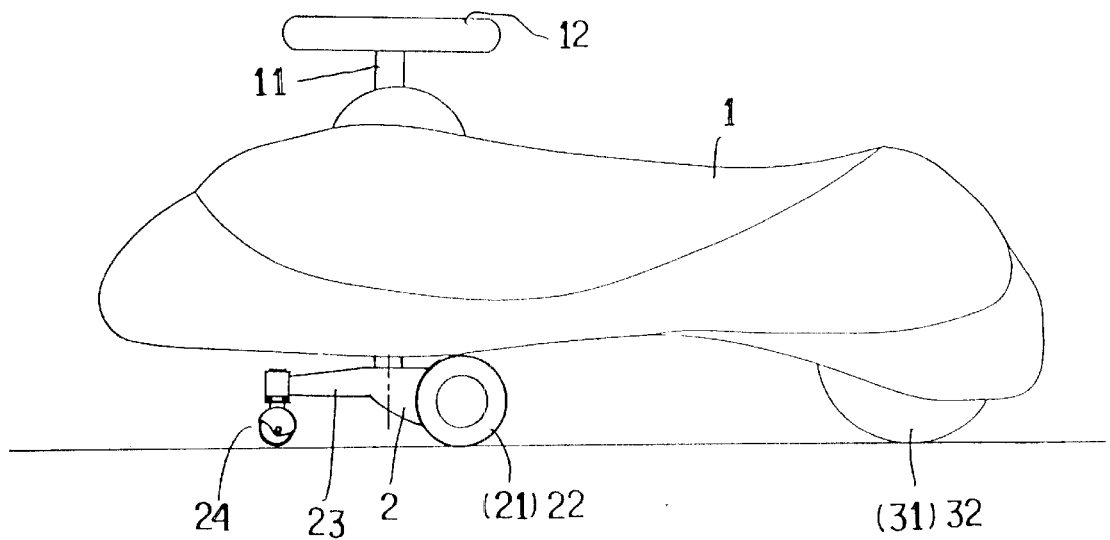
FIG. 5 is a pictorial drawing of the safety equipment constructed according to the invention herein.
Figure 6:
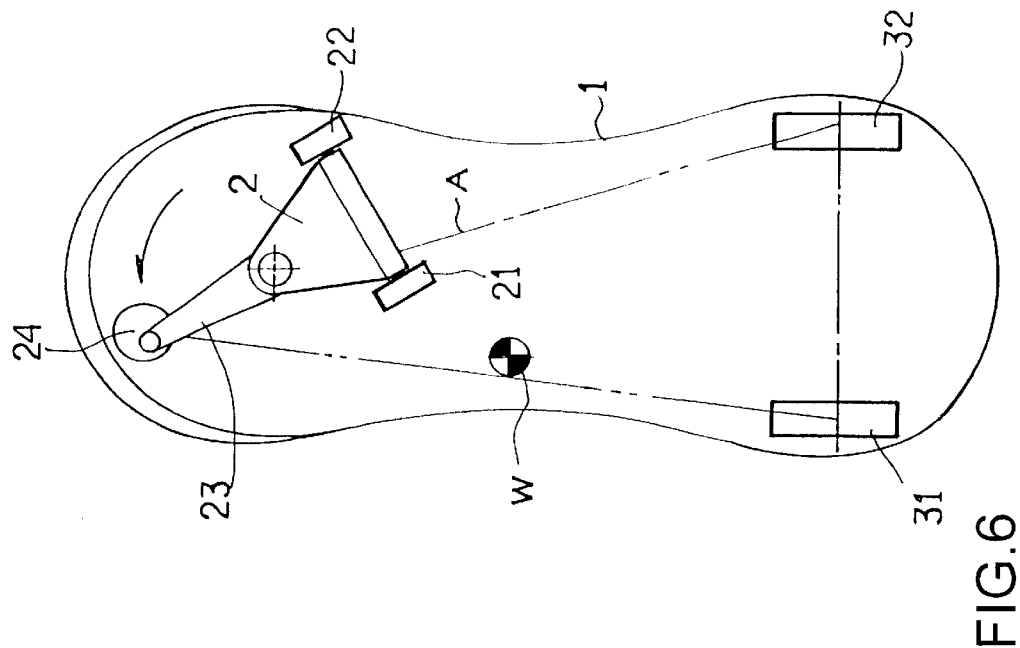
FIG. 6 is the first isometric drawing of the invention herein in functional operation.
Figure 7:
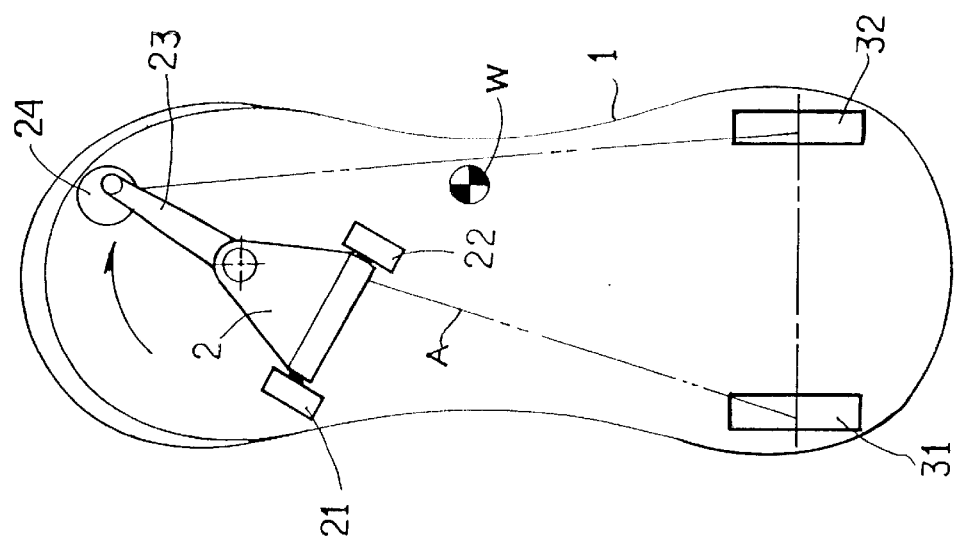
FIG. 7 is the second isometric drawing of the invention herein in functional operation.

Referring to FIG. 4, to prevent the problem of having the tendency to flip over of the conventional scooter, an extended forward wheel arm (23) is mounted at the front end of the driving triangular base; an auxiliary wheel (24) capable of making universal rolling mounted at the end of the wheel arm (23) and relative to the center forward position of the rear driving wheels (21, 22); therefore, while the handlebars are operated to drive, through the center point defined by the disposed shaft level (11), as shown in FIG. 5, to make the triangular base (2) to swing right and left, and also through the said triangular base (2) to gear the driving wheels (21, 22) to proceed arcuately to left or right. Referring to FIGS. 6 and 7, since there is an auxiliary wheel (24) mounted lively at the end of the back of the front wheel arm (23) on the triangular base (2), if the scooter body makes more obvious bounce during the proceeding movement, the said auxiliary wheel (24) will allow the forward touching point fall directly on the said auxiliary wheel (24); also as shown in FIG. 6, if the gravity force of the whole scooter body (1) leaning forward falls on the auxiliary wheel (24), the said auxiliary wheel (24) relative to the two rear wheels (31, 32) mounted on the rear sides of the scooter body (1) will immediately define a larger triangular safety supporting area (A), just as the force center (W) shown in FIGS. 2 and 3, (with the same momentum, the deviating position will be the same), the force center will be regulated within the larger safety area (A), even when the handlebars are operated to deviate to the right, as shown in FIG. 7, the auxiliary wheel (24) relative to the rear wheels (31, 32) will as well define a larger safety area (A) allowing the force center (W) to be regulated to shift within the safety area (A), therefore, protecting the scooter from the danger of flipping over; by means of the universal wheel (24) mounted at the end of the extended forward wheel arm (23) on the triangular base (2) to efficiently enlarge the access to the safety area and enable the force center (W) still shift within the said larger safety area even if the force center deviates; furthermore, the auxiliary wheel (24) is a universal wheel, so either because of automatic movement, under forcing or wobbling operation, the universal wheel will move along to any direction without encountering the obstacle caused by the angle of proceeding; basically, to have the universal wheel with the height from the ground higher than that of the driving wheels (21, 22) and the auxiliary wheel (24) cooperating in time with the rear wheels (31, 32) to form a larger safety area when the scooter body (1) bounces obviously during proceeding or the force center deviates, thus, the equipment properly and efficiently achieves the safety purpose.

Furthermore, the length of the wheel arm (23) is better limited within the outer rim of the scooter body; if too long, the burden of operation the wobble will be effected; if too short, then there is no functional meaning; in fact, the length should be the diameter of the arcuate movement of the auxiliary wheel (24) no longer than the wheel base between the two rear wheels.

Therefore, the invention herein provides a safety driving equipment for the toddler's scooter and meets new patent application requirements and is hereby lawfully submitted to the patent bureau for review and the granting of the commensurate patent rights.

What is claimed is:

1. A safety scooter comprising:

a) a scooter body having an outer rim and two rear wheels, the two rear wheels being laterally spaced apart a predetermined wheel base distance;

b) a steering shaft turnably mounted in a front portion of the scooter body and having an end portion extending from a bottom of the scooter body;

c) a triangular base attached to the end portion of the steering shaft adjacent to a first corner of the triangular base so as to turn with the steering shaft, the triangular base including two driving wheels mounted at second and third corners, respectively; and, d) a front wheel arm extending from the first corner of the triangular base and having a universal auxiliary wheel mounted at an end thereof, a length of the front wheel arm being such that the auxiliary wheel remains within the outer rim of the scooter body during turning of the triangular base and such that the auxiliary wheel undergoes arcuate movement about an arc having a diameter no greater than the wheel base distance between the two rear wheels, wherein the length of the front wheel arm is such that the auxiliary wheel undergoes arcuate movement about an arc having a diameter equal to the wheel base distance between the two rear wheels.

* * * * *